United States Patent
Richmond et al.

(10) Patent No.: US 10,532,875 B2
(45) Date of Patent: Jan. 14, 2020

(54) PRESSURIZATION APPARATUS FOR USE WITH ORGANIC LEAFY MATERIALS

(71) Applicant: Banana Bros, LLC, Culver City, CA (US)

(72) Inventors: David Richmond, Culver City, CA (US); Howard Richmond, Los Angeles, CA (US)

(73) Assignee: Banana Bros, LLC, Culver City, CA (US)

( * ) Notice: Subject to any disclaimer, the term of this patent is extended or adjusted under 35 U.S.C. 154(b) by 0 days.

(21) Appl. No.: 15/839,641

(22) Filed: Dec. 12, 2017

(65) Prior Publication Data

US 2019/0177073 A1    Jun. 13, 2019

(51) Int. Cl.

| | |
|---|---|
| *B65D 81/20* | (2006.01) |
| *A01G 5/06* | (2006.01) |
| *A23L 3/34* | (2006.01) |
| *B65D 81/26* | (2006.01) |
| *A23L 3/015* | (2006.01) |
| *A23L 3/3436* | (2006.01) |
| *F25D 11/00* | (2006.01) |
| *B65D 43/02* | (2006.01) |

(52) U.S. Cl.
CPC .......... *B65D 81/268* (2013.01); *A23L 3/0155* (2013.01); *A23L 3/3436* (2013.01); *B65D 43/0204* (2013.01); *F25D 11/003* (2013.01)

(58) Field of Classification Search
CPC .. A01G 5/06; A01G 5/00; A23B 7/148; A23L 3/3418; B65B 31/00
USPC .......................................................... 426/419
See application file for complete search history.

(56) References Cited

U.S. PATENT DOCUMENTS

| | | | | |
|---|---|---|---|---|
| 2,632,286 | A * | 3/1953 | Newhall | A01G 5/00 312/31.1 |
| 2,994,424 | A * | 8/1961 | Selby | B65D 75/10 206/423 |
| 3,895,140 | A * | 7/1975 | Sheldon | A01N 3/00 427/4 |
| 4,287,222 | A * | 9/1981 | Robinson | A01N 3/00 427/4 |
| 4,627,336 | A * | 12/1986 | Nam | C23F 15/00 141/63 |
| 5,093,080 | A * | 3/1992 | Keller | A23B 7/148 422/112 |
| 5,311,988 | A * | 5/1994 | Bronson | A63B 39/025 206/315.9 |
| 6,862,980 | B2 * | 3/2005 | Heil | A23B 7/152 206/213.1 |

(Continued)

*Primary Examiner* — Dana Ross
*Assistant Examiner* — Lawrence H Samuels
(74) *Attorney, Agent, or Firm* — Smyrski Law Group, A.P.C.

(57) ABSTRACT

An apparatus is provided including a sealable fluid-tight container comprising leafy organic material and a one-way fluid-tight valve, a pressure source, and means for connecting the pressure source to the sealable fluid-tight container such that the pressure source applies fluid pressure to the sealable fluid-tight container via the one-way fluid-tight valve. The pressure source is configured to provide fluid to the sealable fluid-tight container comprising the leafy organic material and the one-way fluid-tight valve keeps received fluid from escaping the sealable fluid-tight container.

20 Claims, 4 Drawing Sheets

(56) References Cited

U.S. PATENT DOCUMENTS

| | | | | |
|---|---|---|---|---|
| 8,250,805 B2* | 8/2012 | Jaiswal | ................ | A01G 5/06 47/41.01 |
| 2008/0184899 A1* | 8/2008 | Richmond | ............ | A23B 7/148 99/472 |
| 2009/0227454 A1* | 9/2009 | Jaiswal | ................ | A01G 5/06 504/114 |
| 2016/0037729 A1* | 2/2016 | Pandit | ................ | A01G 5/06 47/41.01 |
| 2016/0264338 A1* | 9/2016 | Growden | ............... | B65B 31/00 |

* cited by examiner

PRESSURIZATION APPARATUS FOR USE WITH ORGANIC LEAFY MATERIALS

BACKGROUND

I. Field

The present invention relates generally to preserving items at risk of spoiling, and more particularly, to preserving decaying materials such as organic leafy substances beyond their traditional shelf lives.

II. Background

Certain products and materials are subject to spoilage. Food products and other items have limited shelf lives, ranging from less than a day to a number of weeks and sometimes more. In an effort to extend shelf lives, certain techniques have been employed, such as refrigeration or freezing. Freezing is inadequate for materials such as leafy green organic substances, such as lettuce, brussels sprouts, and so forth. Both refrigeration and freezing have issues with transportation and cost. While some transportation has been developed to assist in transportation of items at risk of spoilage, such as refrigerated trucks, these can be costly to employ and/or provide.

Some have developed a method of removing air from a closed container, such as a deformable bag, with the belief that this will preserve the material therein. The results for using this method have been mixed. While there are certain situations where products or materials subject to spoilage can be preserved by removing air from their closed containers, such as by vacuum sealing or vacuum packing the products or materials in a closed container, in many situations the additional preservation time, i.e. the marginal increase in time of preservation, is minimal. In some instances, removing air from a closed container also draws moisture out of the product or material within the container, which can impact the appearance, taste, texture, and other qualities of the product or material, and the preservation time of some products or materials can be decreased when air and/or moisture has been removed.

It would therefore be beneficial to provide a device or apparatus that improves the preservation of products or materials subject to spoilage, including but not limited to organic leafy substances, which improves on previous designs and is relatively inexpensive to produce.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

According to one aspect of the present design, there is provided an apparatus, comprising a sealable fluid-tight container comprising leafy organic material and a one-way fluid-tight valve, a pressure source, and means for connecting the pressure source to the sealable fluid-tight container such that the pressure source provides fluid into the sealable fluid-tight container via a one-way fluid-tight valve. The pressure source is configured to provide fluid to the sealable fluid-tight container comprising the leafy organic material and the one-way fluid-tight valve keeps received fluid from escaping the sealable fluid-tight container.

According to a further aspect, there is provided an apparatus, comprising a sealable fluid-tight container comprising a leafy organic substance and means for pressurizing the sealable fluid-tight container to a desired pressure level. The sealable fluid-tight container comprises a one-way fluid-tight valve. The means for pressurizing is configured to provide fluid to the sealable fluid-tight container comprising the leafy organic substance and the one-way fluid-tight valve keeps received fluid from escaping the sealable fluid-tight container.

According to another aspect, there is provided an apparatus, comprising a sealable fluid-tight container comprising a leafy organic material, a fluid-tight closable element facilitating receiving the leafy organic material, and a one-way fluid-tight valve, and a means for pressurizing the sealable fluid-tight container to a desired pressure level. The means for pressurizing is configured to provide fluid into the sealable fluid-tight container comprising the leafy organic substance and the one-way fluid-tight valve keeps received fluid from escaping the sealable fluid-tight container.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

In this document, the words "embodiment," "variant," and similar expressions are used to refer to a particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity.

The present design is comprised of a pressure source configured to provide a quantity of fluid, such as air, to a closed container, wherein the closed container includes an opening or a plurality of openings, wherein each opening may include a valve that allows for fluid to enter into the closed container. Each opening prohibits fluid provided from the pressure source from escaping. In this manner, the closed container may contain a desired product or material, such as a leafy organic substance, and may be pressurized with the fluid. It has been found that construction and operation of such a device can increase the lifespan or shelf life of certain organic materials.

While discussed herein primarily with respect to leafy organic substances, it is to be understood that the present design may be used with other materials. Organic leafy materials such as lettuce, cabbage, brussels sprouts, spinach, kale, and cannabis may be employed in the present design, but other products or materials may be preserved using the teachings of the present design, including but not limited to perishable items such as fruits or vegetables.

Figure 1:
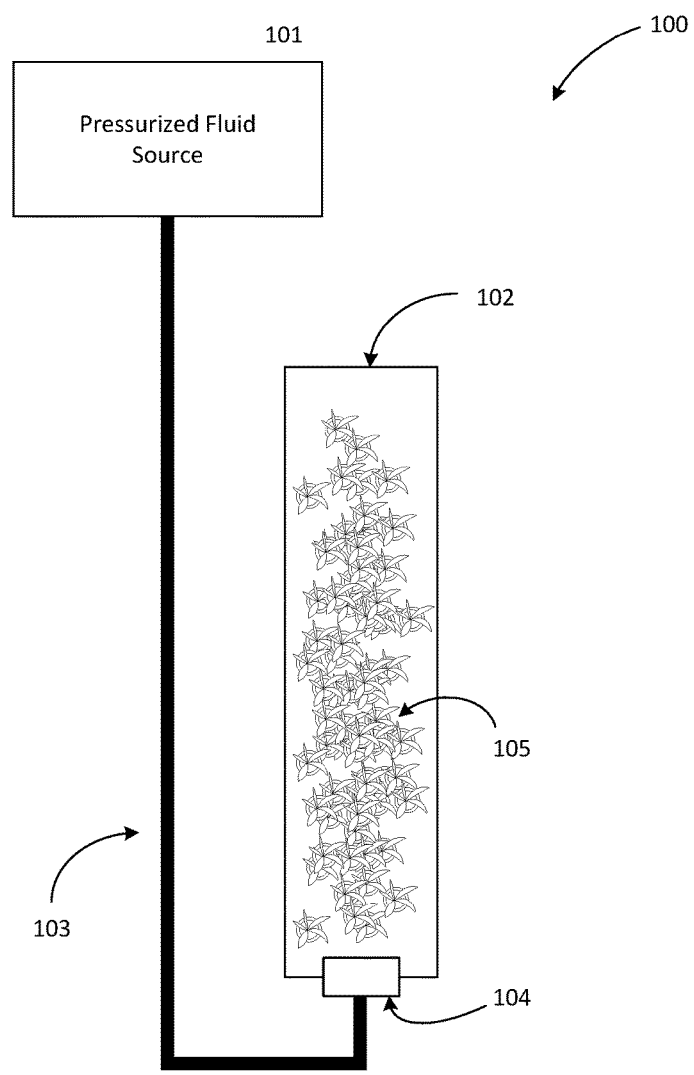
FIG. 1 is a general conceptual depiction of the operation and elements of the present design.

FIG. 1 illustrates a conceptual overview of a first embodiment of the present design. From FIG. 1, there is provided a pressurization unit 100 comprising a pressurized fluid source 101, a container 102 including organic leafy material 105, and a connection 103, which may be optional, that connect the pressurized fluid source 101 to container 102. In one embodiment, the pressurized fluid source may be directly connected to or in contact with the container without connection 103. A one-way valve 104 is provided with container 102 and allows fluid to pass through the valve in one direction, namely into container 102, but not out from the container 102.

Pressurized fluid source 101 may provide an appropriate fluid, such as air or some other inert gas, but other components may be provided, such as a means for determining the amount of moisture within or outside container 102. The provision of an inert gas, such as air, can increase the shelf life of certain products or materials without use of refrigeration or freezing. Pressurized fluid source 101 may be a wall-mounted fluid source, or a pump that takes in air and provides air, such as in a pressurized state, or other pressurized fluid source appropriate based on circumstances.

Figure 3:
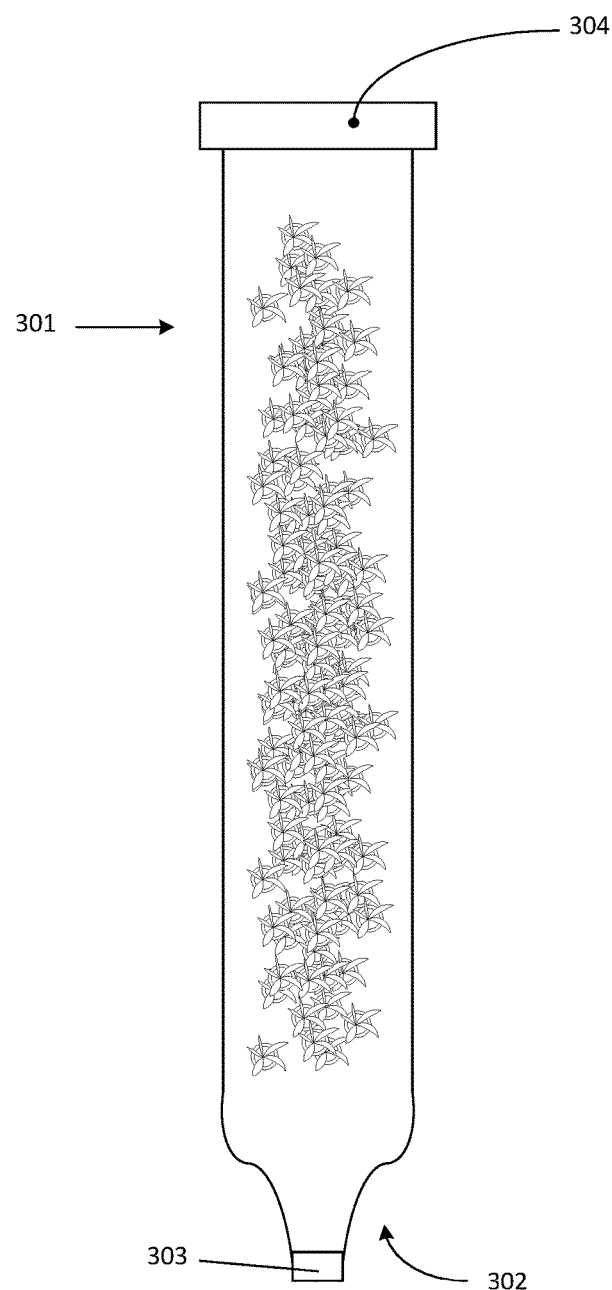
FIG. 3 shows a container that may be employed with the present design.

Container 102 may be any appropriate container that is generally impermeable to fluids, such as inert gases, including but not limited to materials such as soft (deformable) plastic, hard plastic, metal, or otherwise. One embodiment of a container that may be employed as container 102 is illustrated in FIG. 3. Container 102 in this embodiment comprises a hard plastic container 301 with a valve at the end. Such plastic containers are generally commercially available. A connector or connection to a pressurized fluid source may be provided, such as a hose or hard fluid passageway.

Connection 103, which may be included or may be omitted, may include any type of fluid transmission medium, again generally impermeable and configured to withstand pressure being applied. For example, a rubber or plastic tube may be provided between pressurized fluid source 101 and container 102. Multiple elements, such as multiple tubes or passageways may be provided depending on circumstances.

Pressurized fluid may be supplied into a container until the pressure within the container has reached a desired level or pressurized fluid may be used to control pressure within the container. Pressurized fluid may be provided from a pressurized fluid source or from any reasonable source under the circumstances, and in one embodiment, a pump may be employed that intakes air and provides pressure at a value between approximately 0.05 psi and 14.0 psi to realize the benefits discussed herein. Other pressures and pressure ranges may be employed, such as a pressure between exactly 0.05 psi and 14.0 psi, a pressure that is 0.05 psi or below, or a pressure that is 14.0 psi or above, depending on circumstances. The pressure source may include a regulator or feedback system that determines current pressure in the pressure vessel, container, or pressure receiving arrangement and stops or decreases pressure applied to the pressurized region. For example, if 12.0 psi is desired and pressure is applied at or above 12.0 psi, a sensor may be employed that senses the pressure in the pressure vessel or container is at 12.0 psi and may shut off the pressurized fluid source, may decrease the pressure applied, or may somehow otherwise inhibit the pressure applied. A separate regulator may be provided between the pressurized fluid source 101 and container 102, either in the line connecting these devices or adjacent to one or the other.

As noted, the apparatus includes a one-way valve 104 that enables the filling of container 102 without allowing fluid to escape from the filled container. When the pressure source is turned off, either manually or automatically, or pressure is decreased, the fluid that has been provided to container 102 at the desired pressure stays within container 102. At this point, container 102 may be removed from any attachment to the pressurized fluid source and may be stored or otherwise transported. In one embodiment, as discussed below, the container 102 may include a removable or openable apparatus or surface, such as a cap or twist-off seal or other device, which may be used to decrease the pressure within container 102 and allow the user to access the product stored within container 102. Hence the container, with the one-way valve and an opening element or apparatus, that is sealed and air tight or constructed to prevent fluid loss is employed in the present design.

Figure 2:
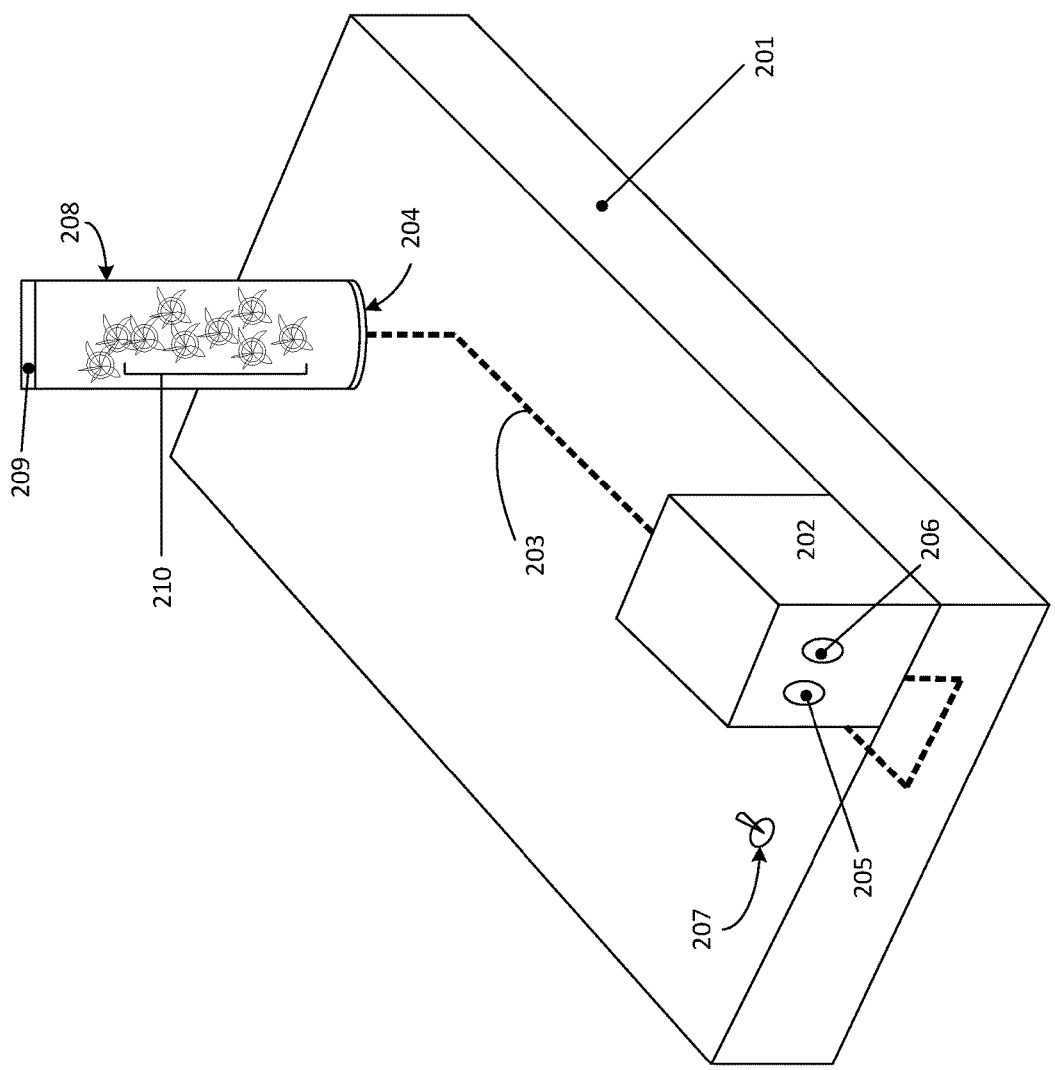
FIG. 2 illustrates a tabletop embodiment of the present design.

FIG. 2 illustrates one embodiment of the design, but other embodiments or designs may be employed according to the teachings provided herein. The design of FIG. 2 may be placed on or affixed to a tabletop or other flat surface and includes a base 201, a pressure source 202, and a line 203, such as a tube or a pipe, not visible to the user but provided to an opening 204, thereby connecting the pressure source 202 to the opening 204. The pressure source may be any type of appropriate device, such as a pump usable to receive ambient air and pump compressed air via line 203. The pressure source 202 may be a pump, and the pump may be powered by a power source, such as batteries or an electrical power connection, such as to a standard AC wall plug. The pump may intake air via openings 205 and 206. Different appropriate openings or access points may be provided, including a single intake opening. A manual switch 207 is provided that is connected to pressure source 202 (connection not shown in this view) and turns a power source (also not shown in this view) on and off, thereby powering the pump. In this arrangement, the pump is turned on, provides pressure at a given pressure, such as at a level between 0.5 psi and 14.0 psi, to a container 208 positioned in opening 204 and containing organic leafy material, and the one-way valve (not shown in this view) enables container 208 to establish and maintain the desired pressure. Container 208 includes a lid 209 in this embodiment such that the lid can be opened and the organic material 210 retrieved when desired. In some instances, more material can be placed in container 208, the lid 209 reengaged, the container laced in the opening 204 of the base 201, and the container can be pressurized as desired. In this manner containers can be reused and multiple containers including desired material may be pressurized and employed.

FIG. 3 is an illustration of one embodiment of a container that may be employed with the current design. Container 301 includes a fluted end 302 that includes a one-way valve 303 and removable top 304. As noted, the top or lid may be opened to insert material, closed, and the container has a fluid-tight seal, such as an air-tight seal, that can be pressurized. Container 301 is designed to withstand pressurization in the ranges and to the levels disclosed herein. Note that in all drawings the organic material or organic leafy material or product is distributed unevenly. Distribution of the organic leafy material as shown herein is not intended to be representative of distribution within the components but is intended to be illustrative and representative of material provided.

Figure 4:
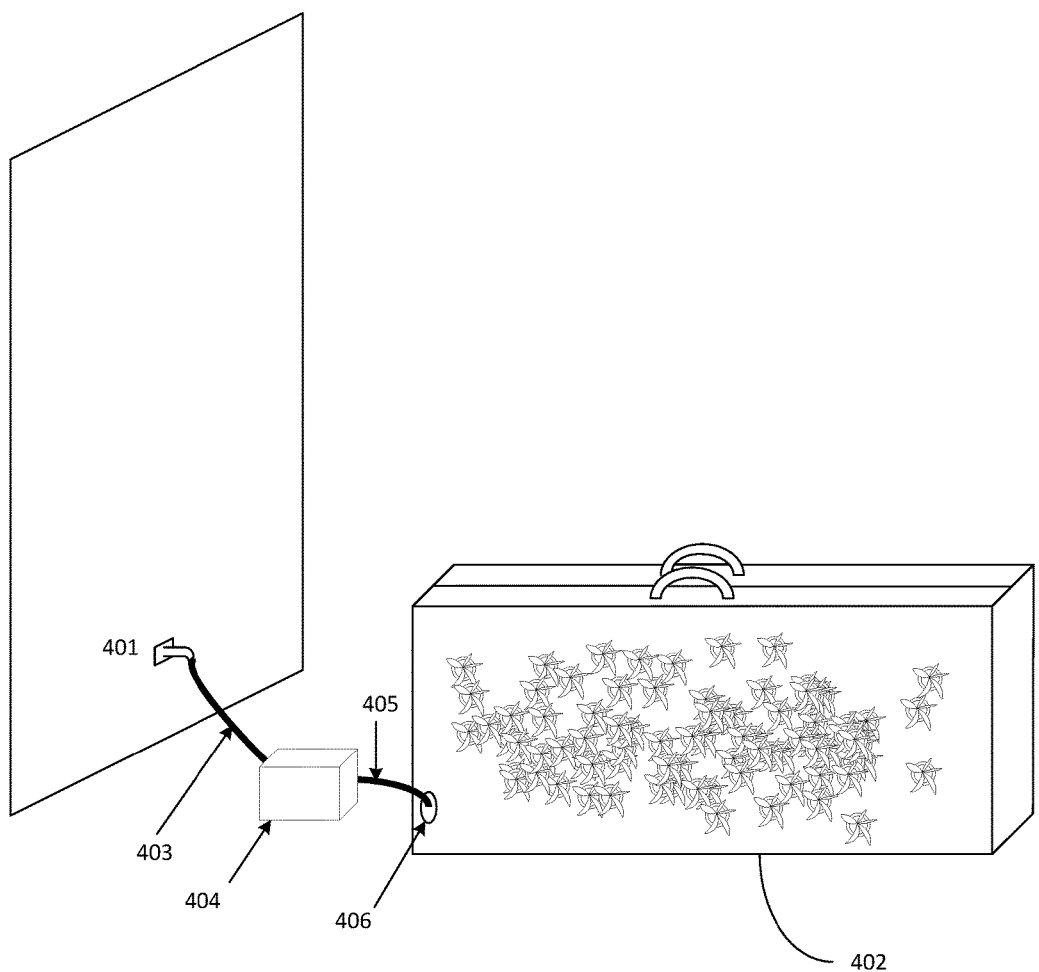
FIG. 4 is an alternative embodiment of the present design.

FIG. 4 is an alternative embodiment intended to show the breadth of the present design. FIG. 4 includes a wall-originating pressure source 401 configured to provide pressurized fluid, such as pressurized air, to container 402. Container 402 contains material, such as leafy organic material, and may be provided in the shape of a suitcase or other container. Again, closing container 402 provides a fluid-tight or air-tight seal and allows fluid to be provided to the container. In this embodiment, line 403, such as a pipe or tube, is provided from wall originating pressure source 403 to pressure regulator 404, and a second line 405 connects the pressure regulator 404 to container 402 at point 406. A one-way valve is provided but not shown in this view, and may be provided with container 402. Pressure regulator 404 regulates the pressure to a desired level. In one instance, air may be provided by wall originating pressure source 401 at a high psi level, and pressure regulator 404 decreases the pressure provided to second line 405 and container 402. In another embodiment, fluid is slowly supplied into the container 402 and once the pressure reaches a certain level as sensed by pressure regulator 404, pressure regulator 404 decreases the pressure applied, possibly to zero. Container 402, including the organic material, may then be removed from second line 405 and may be transported or otherwise relocated as desired. When the user desires access to the material in the pressurized container, the user may open the sealed container and may retrieve the material.

Thus according to one aspect of the present design, there is provided an apparatus, comprising a sealable fluid tight container comprising leafy organic material and a one-way fluid tight valve, a pressure source, and means for connecting the pressure source to the sealable fluid tight container such that the pressure source applies fluid pressure to the sealable fluid tight container via the one-way fluid tight valve. The pressure source is configured to provide fluid to the sealable fluid tight container comprising the leafy organic material and the one-way fluid tight valve keeps received fluid from escaping the sealable fluid tight container.

According to a further aspect, there is provided an apparatus, comprising a sealable fluid tight container comprising a leafy organic substance and means for pressurizing the sealable fluid tight container to a desired pressure level. The sealable fluid tight container comprises a one-way fluid tight valve. The means for pressurizing is configured to provide fluid to the sealable fluid tight container comprising the leafy organic substance and the one-way fluid tight valve keeps received fluid from escaping the sealable fluid tight container.

According to another aspect, there is provided an apparatus, comprising a sealable fluid tight container comprising a leafy organic material, a fluid tight closable element facilitating receiving the leafy organic material, and a one-way fluid tight valve, and means for pressurizing the sealable fluid tight container to a desired pressure level. The means for pressurizing is configured to provide fluid to the sealable fluid tight container comprising the leafy organic substance and the one-way fluid tight valve keeps received fluid from escaping the sealable fluid tight container.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprised of" as "comprised of" is interpreted when employed as a transitional word in a claim.

The invention claimed is:

1. An apparatus, comprising:
   a sealable fluid-tight container comprising leafy organic material, an opening configured to receive the leafy organic material at one end, and a one-way fluid-tight valve at a second end opposite the first end, wherein the leafy organic material exclusively comprises material from the Cannabaceae family;
   a pressure source that applies pressure to the sealable fluid-tight container comprising the leafy organic material to a level between 12.0 and 14.0 psi; and
   a hose connection arrangement configured to connect the pressure source to the sealable fluid-tight container such that the pressure source applies fluid pressure to the sealable fluid-tight container via the one-way fluid-tight valve;
   wherein the pressure source is configured to provide fluid to the sealable fluid-tight container comprising the leafy organic material and the one-way fluid-tight valve keeps received fluid from escaping the sealable fluid-tight container;
   wherein the opening allows for filling the sealable fluid-tight container and the opening remains closed when the pressure source applies pressure to the sealable fluid-tight container comprising the leafy organic material to the level between 12.0 and 14.0 psi.

2. The apparatus of claim 1, wherein the fluid comprises air.

3. The apparatus of claim 1, wherein the pressure source comprises a pump and the fluid comprises air, wherein the pump receives air and provides air to the sealable fluid-tight container.

4. The apparatus of claim 1, wherein the hose connection arrangement comprises a connection element configured to connect the pressure source with the sealable fluid-tight container.

5. The apparatus of claim 4, wherein the connection element is configured to connect to the sealable fluid-tight container, thereby forming a fluid-tight seal.

6. The apparatus of claim 1, wherein the leafy organic material comprises cannabis.

7. The apparatus of claim 3, wherein the pump comprises a power switch.

8. The apparatus of claim 1, further comprising a pressure regulator configured to regulate pressure of fluid provided to the sealable fluid-tight container.

9. The apparatus of claim 1, wherein the hose connection arrangement comprises a base, wherein the pressure source provides pressurized fluid to the base, and the sealable fluid-tight container is connectable to the base to form a fluid-tight seal.

10. An apparatus, comprising:
    a sealable fluid-tight container comprising a leafy organic substance and an opening configured to receive the leafy organic material at one end, wherein the leafy organic substance exclusively comprises material from the Cannabaceae family; and a pressure source arrangement that applies pressure to the sealable fluid-tight container to a desired pressure level between 12.0 and 14.0 psi;

wherein the sealable fluid-tight container comprises a one-way fluid-tight valve at a second end opposite the first end;

wherein the pressure source arrangement is configured to provide fluid to the sealable fluid-tight container comprising the sealable fluid-tight container comprising the leafy organic substance and the one-way fluid-tight valve keeps received fluid from escaping the sealable fluid-tight container;

wherein the opening allows for filling the sealable fluid-tight container and the opening remains closed when the pressure source applies pressure to the sealable fluid-tight container comprising the leafy organic material to the level between 12.0 and 14.0 psi.

11. The apparatus of claim 10, wherein the fluid comprises air.

12. The apparatus of claim 10, wherein the pressure source arrangement comprises a pump that receives air and provides air to the sealable fluid-tight container.

13. The apparatus of claim 10, wherein the leafy organic substance comprises cannabis.

14. The apparatus of claim 12, wherein the pump comprises a power switch.

15. The apparatus of claim 10, wherein the pressure source arrangement comprises a pressure regulator configured to regulate pressure of fluid provided to the sealable fluid-tight container.

16. The apparatus of claim 10, wherein the pressure source arrangement comprises a base and a pressure source, wherein the pressure source provides pressurized fluid to the base and the sealable fluid-tight container is connectable to the base to form a fluid-tight seal.

17. An apparatus, comprising:
a sealable fluid-tight container comprising:
a leafy organic material from the Cannabaceae family;
a fluid-tight closable element located at a first end receiving the leafy organic material; and
a one-way fluid-tight valve located at a second end opposite the first end; and
a pressure source arrangement that pressurizes the sealable fluid-tight container comprising the leafy organic material to a desired pressure level;
wherein the pressure source arrangement provides fluid to the sealable fluid-tight container comprising the leafy organic material to a level between 12.0 and 14.0 psi, and the one-way fluid-tight valve keeps received fluid from escaping the sealable fluid-tight container while the fluid-tight closable element remains closed when the pressure source arrangement applies pressure to the sealable fluid-tight container.

18. The apparatus of claim 17, wherein the pressure source arrangement comprises a pump that receives air and provides air to the sealable fluid-tight container.

19. The apparatus of claim 17, wherein the leafy organic substance comprises cannabis.

20. The apparatus of claim 18, wherein the pressure source arrangement comprises a pressure regulator configured to regulate pressure of fluid provided to the sealable fluid-tight container.

* * * * *